May 22, 1934.    J. M. SPITZGLASS    1,959,743
FLOW METER FOR ELASTIC MEDIUMS
Filed Aug. 6, 1929

Inventor
Jacob M. Spitzglass
by James B. Lewis
Attorney

Patented May 22, 1934

1,959,743

UNITED STATES PATENT OFFICE 1,959,743

FLOW METER FOR ELASTIC MEDIUMS

Jacob M. Spitzglass, Chicago, Ill., assignor to Republic Flow Meters Company, Chicago, Ill., a corporation of Illinois Application August 6, 1929, Serial No. 383,795

13 Claims. (Cl. 177—351)

This invention relates to a method of and apparatus for measuring compressible fluids, such as air, gas, steam, etc., and applies particularly to that class of meters known to those skilled in the art of metering, as "flow meters".

The term "flow meter" contemplates a device for determining the rate of flow of a fluid in a conduit from the differential head produced by the flow rather than being measured directly as in quantity meters. The differential head may be produced by any of the well known types of differential pressure producers such as the Venturi tube, orifice or flow nozzle in the flow stream, and where the head is translated into electrical energy and the rate of flow indicated by suitable instruments the meter is designated an "electric flow meter".

The volume of weight of the flow may be determined from the velocity and area of the flow stream, and the readings of the meter can be indicated in suitable units, for example, as cubic feet per unit of time or pounds per hour, etc.

This invention applies to meters of the differential type such as the venturi, nozzle or orifice, etc., wherein the determinations are based upon the head or differential pressures at certain points in the flow stream. The fundamental formula of these meters is $$V = \sqrt{2gh}$$

in which
V=theoretical rate of discharge, cubic feet per second.
g=acceleration of gravity.
h=head expressed in suitable units.

For known reasons the rate of flow actually computed from this formula is usually slightly different from the theoretical value and the practical equation is $$V = CM\sqrt{2gh}$$

in which
C=discharge coefficient.
M=meter constant.

Flow meters were first designed for the metering of liquids and as a consequence thereof the equation above given has come to be known as the hydraulic equation. While this equation gives remarkably accurate results when applied in the measurement of incompressible fluids such as water, oil, etc., it is a well recognized fact that it does not give correct results when applied to compressible fluids. Thus Part 1 of the report of the American Society of Mechanical Engineers, Special Research Committee on Fluid Meters, Second Edition, devotes considerable space to the discussion of the application of the hydraulic formula to the measurement of compressible fluids.

When the differential pressure across the pressure producing device is greater than two percent of the absolute inlet pressure, the readings of the meter measuring a compressible fluid such as steam, gas, etc., will be too high by an appreciable amount. This is caused by the compressibility of the gas or steam passing through the pressure differential device. It therefore, follows, that for accurate results the compressibility of the fluid must be taken into account and the readings accordingly corrected. Heretofore, compressibility of the fluid has been corrected by either the complete thermodynamic equation or by the use of the hydraulic equation and a correction factor which had to be applied to the assumed average readings of the meter. That is to make the correction accurate in either case it is necessary to solve the equation for each instantaneous and varying reading of the meter, or to likewise apply the corresponding correction factor.

The thermodynamic equation, and example of which is given in appendix C in the above mentioned fluid meter report, is so complicated as to be impracticable for every day use. The use of the hydraulic equation and a correction factor, while less cumbersome than the use of the thermodynamic equation, is still inaccurate because the correction factor is not the same for all volumes measured by the meter. A given correction factor is only accurate for one given point on the dial of the flow meter. This results in over correction at some points and under correction at other points and it is practically impossible to secure an average correction throughout the range of the meter reading.

The rate of mass flow as recorded by a flow meter is determined from the general relation $$M = K\sqrt{(p_1 - p_2)w} = K\sqrt{hw} \qquad (1)$$

In which
M is the mass rate of flow
$h = (p_1 - p_2)$ is the differential pressure produced by the flow and utilized to actuate the mechanism of the meter.
w is the density of the fluid at the point of measurement.
K is the meter constant for the given set of conditions.

In the case of elastic fluids, there is an increase in specific volume of the fluid and a resulting increase in velocity due to the reduction of the pressure from $p_1$, immediately ahead to $p_2$, immediately behind the measuring device. Since the change from pressure to velocity in such cases is instantaneous there is no heat energy gained or lost in the transaction, which is the case of adiabatic expansion so well familiar in the science of thermodynamics.

The part of the differential pressure which is consumed in the adiabatic expansion of the flowing mass is not available for transmitting the mass flow through the restriction of the flow meter. In other words, a given pressure drop, $h=(p_1-p_2)$ will, under the same conditions, pass a smaller quantity of mass, when the fluid is subject to expansion as in the case of gases and vapors. Thus the expression $$M=K\sqrt{hw}$$

when applied to the measurement of elastic fluid takes the general form of $$M=KY\sqrt{hw} \qquad (2)$$

Y being the expansion factor, or the ratio of the elastic mass rate corresponding to the given differential "$h$" to the incompressible mass rate corresponding to the same differential. This form may apply to all fluids with the understanding that in the case of liquids the factor Y becomes unity.

From the above consideration $$Y=\frac{M_e}{M} \qquad (3)$$

$M_e$, designating the elastic mass of flow. The percentage correction due to the elasticity of the fluid $$(1-Y)=1-\frac{M_e}{M}=\frac{M-M_e}{M} \qquad (4)$$

It is the object of the applicant's invention to provide means causing the flow meter to register $M_e$ directly, instead of M, and thus obviate the necessity of laborious corrections for the intrinsic error of the meter. The magnitude of the expansion is gauged by the quantity $$\frac{p_1-p_2}{p_1}$$

and, therefore, the reduction in mass flow should be proportional to the same quantity, that is, $$\frac{M-M_e}{M} \sim \frac{p_1-p_2}{p_1} \text{ or } (1-Y) \sim \frac{h}{p_1} \qquad (5)$$

Experiment has shown that in all cases of elastic fluid measurement, the correction factor, $(1-Y)$ is proportional to $h/p_1$ within the limit of experimental accuracy.

Given the size of the meter (orifice or nozzle ratio and maximum differential), the kind of elastic fluid and the initial pressure $p_1$, we find from the available tables and curves the value of the correction factor $(1-Y)$ at the maximum differential of the meter, hmax. Call this value of the factor Cmax. As the flow is reduced to lower values, other conditions (including $p_1$) being constant, we obtain the relation $$(1-Y)=Cmax\frac{h}{hmax} \qquad (6)$$

where the fraction $$\frac{h}{hmax}$$

is the percent of maximum head at any given reading of the meter.

From Equation (1) we obtain the general relation $$\left(\frac{M}{Mmax}\right)^2=\frac{h}{hmax} \qquad (7)$$

Hence $$(1-Y)=Cmax\frac{h}{hmax}=Cmax\left(\frac{M}{Mmax}\right)^2 \qquad (8)$$

That is, the correction factor $(1-Y)$ is proportional to the square of the mass rate of flow through the meter.

An object of the present invention is to provide a meter by which the rate flow of compressible fluids may be accurately determined.

Another object of this invention is to provide a means by which a meter based on the hydraulic equation may be used in the measurement of a compressible fluid, and register the amount accurately.

With these and other objects in view, the invention consists in the improved fluid meter hereinafter described and particularly defined in the claims. It is to be understood, however, that the invention is not limited to the specific form thereof shown and described.

The various features of the invention are illustrated in the accompanying drawing in which.

Figure 1:
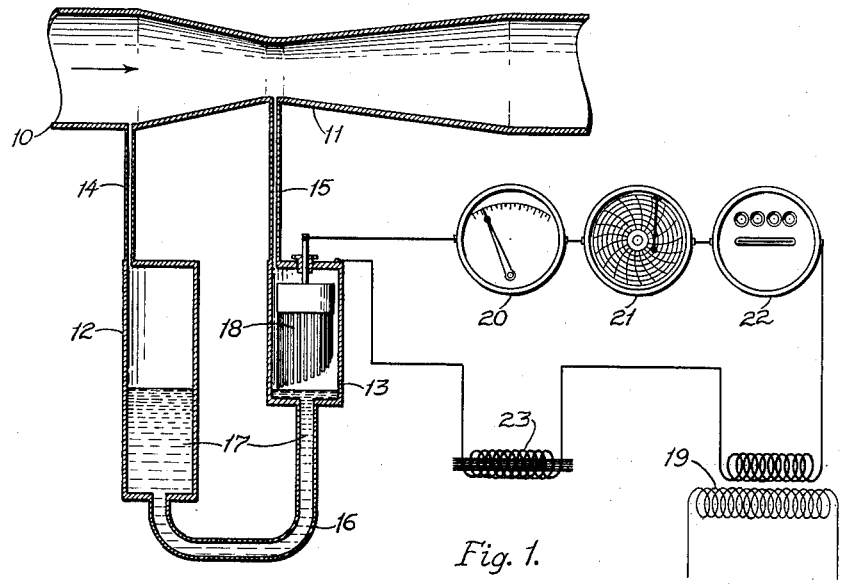
Fig. 1 is a view in front elevation, partly in section, of a fluid meter embodying the preferred form of the invention.

Two means are shown for the automatic correction of the meter readings in compliance with Equation (8). One is of the mechanical type which employs a displacer on the high pressure side of the U-tube to reduce the effective height actuating the mechanism of the meter from the "liquid" value "$h$" to the "gas" value "$h_e$". From Equation (1)

$$\frac{h_e}{h}=\left(\frac{M_e}{M}\right)^2=Y^2 \qquad (9)$$

That is, the effective height at any point is proportional to the height itself or to the square of the mass flow through the meter.

The form of the displacer is a function of the meter mechanism. In some cases the mechanism translates the motion of the moving element in direct proportion to the effective height of the mercury column. In such cases the displacer is of a conical shape which causes the area of the depressed column to reduce uniformly over the entire height. Where the motion is translated parabolically into the square root of the height, the displacer becomes a solid of revolution whose curvature is determined from Equation (9) applied to the given area ratio of the U-tube chambers. In either case the tapered shape corrects the head from minimum to maximum by varying degrees in accordance with the established law of variation.

The induction coil principle is applicable to electrically operated flow meters only. In these instruments the correction is produced by reducing the current flow a predetermined amount and consequently producing a registration on the instrument which is proportional to the corrected mass flow $M^e$. Since this reduction is a constantly diminishing one it is necessary to insert in the circuit a device whose effect on the circuit is constantly diminishing to the same extent as the desired correction. Applicant accomplishes this by means of the reactance coil which causes a very large increased impedance at the higher readings where the circuit resistance is small and much smaller increases in impedance when the reading is low and the circuit resistance much higher.

It is well known that when vector quantities such as resistance and impedance are placed in series their mutual effect depends on their relative proportions. The impedance of the circuit determines the reading by a principle well known in electrical metering art and very clearly shown in the drawing. In order to effect the desired corrections, the impedance must be corrected a maximum amount at the high readings and much less at the low readings, the exact relation being shown in Equation (8) above, which, expressed in terms of percent of reading (Q) gives an equation $$(1-Y)=Cmax.Q^2 \qquad (10)$$

The above is very easily demonstrated by drawing a simple vector diagram showing the resistance and inductance at right angles to each other and representing the impedance by the hypotenuse. It is obvious that as the resistance increases the angle between the resistance and impedance legs becomes very small and it is well known that the difference between the two approaches zero as the resistance becomes very large and the angle very small. Conversely, as the resistance becomes small the angle becomes large and the impedance changes very quickly with respect to the resistance.

Referring to the exemplary embodiments of the invention, illustrated in the drawing, the numeral 10 indicates a conduit through which the fluid to be measured flows. This conduit has disposed therein a differential pressure producing device 11 shown as a Venturi tube, but it is to be understood that it may as well be a nozzle, or orifice plate or other similar device, for producing differential pressure incident to the flow of fluid through the conduit. Closed chambers 12 and 13 are connected by leading and trailing tubes 14 and 14, respectively, to the conduit 10 at the high and low pressure points therein. The chambers 12 and 13 are connected by a tube 16 and the arrangements is such that they form a U-tube adapted to contain a liquid 17 which for the purpose of this invention is preferably a conductor of electricity, such as mercury. It will be apparent that the legs of the mercury column will be subjected to the different pressures produced by the Venturi 11 so that the mercury will rise in chamber 13 to a certain height above the mercury level in the chamber 12, the height being dependent upon the differential pressure produced in the conduit.

A resistance element or scale 18 is disposed within the chamber 13 and form part of an electric circuit supplied with electro-motive force from the transformer 19. The electric circuit also contains a conductance indicator 20, a conductance recorder 21 and a conductance integrator 22 for indicating, recording and integrating, respectively, the flow of fluid through the conduit 10.

As it is assumed that the height of a liquid column balancing a differential pressure produced by the flow of fluid in a conduit is proportional to the square of the velocity of the flow in the conduit. It is, therefore, apparent that to make an electric current proportional to the flow of fluid through the conduit, it is only necessary that the current be proportional to the square root of the height of the liquid column balancing the differential pressure produced by the flow. The resistance 18 is so wound that the conductance of the electric circuit is varied continuously by the rise and fall of the mercury in chamber 13 and all times in proportion to the square root of the height of the mercury in the chamber 13.

As hereinbefore stated the meter just described is particularly well adapted for the measurement of incompressible fluids, such as liquids, and is also fairly accurate for the measurement of compressible fluids within certain limits as, for example, where the differential pressure is less than two percent of the absolute inlet pressure the results are accurate to within a fraction of a percent and the error can ordinarily be disregarded. However, when the differential pressure exceeds two percent of the absolute inlet pressure, as it frequently does in the measurement of high velocity flows as in the case of elastic fluids such as steam or the like where the velocity of fluid runs up to and exceeds 10,000 feet per minute, the error caused by the compressibility of the fluid, in passing through the differential pressure device, becomes perceptible and makes the indication erroneous by an appreciable amount, that is, the instrument readings indicate a greater amount of flow than actually passes through the conduit. It will thus be apparent that, for accurate results, the instruments must be slowed up in their operation. To add to the intricacy of the problem of making the indications conform to the actual flow of the fluid the error does not vary directly as the flow but on the other hand the variation is proportional to the square of the flow. Thus for a fifty percent reading the correction necessary is one fourth of the correction at maximum reading, while at seventy percent it is approximately one-half, and so on throughout the range of the meter.

In order to adapt a meter, based on the hydraulic equation, to the measurement of a compressible fluid it therefore follows that the indications of the instrument must be modified to read in accordance with the thermodynamic equation. I have found that by choosing a suitable compensating reactance for the meter circuit that this can be accomplished.

The characteristics of the reactance coil required to produce the above result can be determined by calculations as explained above or by empirically determining the required value of the inductance. In designing this coil there are many factors to be taken into consideration the principal ones being, the resistance of the wire forming the coil, the number of turns in the coil, size of core, and width of air gap. Of these factors it has been found that it is better to standardize on all of these except one, in so far as that is practicable, and to vary that one to secure the proper correction. Accordingly varying the number of turns of wire has been found practicable since varying the length of wire in the coil has the effect of varying the conductance of the meter circuit which increases or decreases the speed of operation of the indicating instruments.

Figures 3, 4:
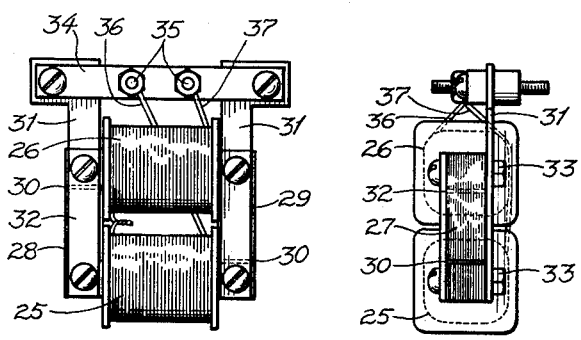
Fig. 3 is a view in elevation of a reactance coil.
Fig. 4 is a side view of said coil.

There is shown in Figures 3 and 4, by way of example, the details of a coil which has been found satisfactory for a meter requiring a ten percent correction on a liquid deflection of 215 inches of water at maximum flow. The coil preferably consists of two coils 25 and 26 of No. 22 double cotton covered copper wire wound upon a laminated core 27 the laminations of which are of electric steel. For convenience of manufacture and assembly the core is made up in two substantially L shaped sections 28 and 29 and the coils are wound upon one leg of each of the sections and when the sections are assembled as shown in Fig. 3 the axis of the coils are parallel with each other. Spaces of substantially .018 of an inch are left between the contiguous parts of the two sections to serve as air gaps and to secure uniformity of width of said gaps, a spacer 30 of phosphor bronze is placed therein. While these spacers insure uniformity of the gaps during assembly, it is to be understood that they may be omitted and the spaces left open if desired.

The core sections are held in position by brackets 31 and tie strips 32 secured to each other by suitable securing means such as bolts 33, as shown in Fig. 4. The brackets also serve as anchoring means by which the coil may be held in position when in use and a terminal strip 34 of insulating material, is conveniently carried by said brackets. This terminal strip forms a support for the binding posts 35 which are adapted to be connected in series in the meter circuit.

As seen in Fig. 4, the coils are reversely wound, that is, coil 26 is wound clockwise while coil 25 is wound counter clockwise, and the coils are connected in series and each coil consists of substantially 173 turns of wire. The end of the wire 36 of coil 26 is connected to one of said binding posts 35 while the lead 37 from coil 25 is connected to the other of said posts 35.

Obviously the above dimensions and character of material and arrangement of the coils may be varied to suit the exigencies of a particular situation and they are only given to serve as an example of how the coil may be constructed. To secure different degrees of correction it is only necessary to vary the number of turns of wire in the coils. Thus it will be seen that the compensating coil lends itself to ease of manufacture, is comparatively simple and can be readily installed in meters as manufactured or in meters in the field by simply connecting it in series in the meter circuit.

Figure 2:
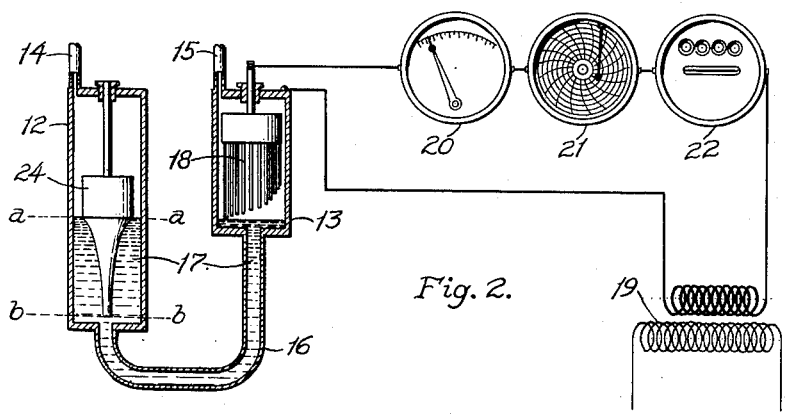
Fig. 2 is a front view, partly in section, of another form of the invention.

Another method of connecting for compressibility is illustrated in Fig. 2. Wherein a displacement element is placed in the high pressure chamber 12 which varies the rise and fall of the mercury level in chamber 13 sufficient to change the resistance of the meter circuit to cause the indications of the instruments to read correctly when a compressible fluid is measured.

The displacing element 24, which for convenience is shown as supported from the top of chamber 12, is a figure of revolution such that its cross-sectional area decreased from the line $a$—$a$, indicating the level of the mercury when there is no flow in the conduit 10, to the line $b$—$b$ which the mercury reaches when the flow in the conduit reaches maximum. The cross-section of the displacing element is such that the rise of the mercury in chamber 13, due to the displacement effected by the descent thereof in chamber 12 with rise of the velocity of flow in conduit 10, varies the resistance of the electric circuit so that the current therein bears a definite relation to the velocity of the flow.

The shape of the displacing element 24 required to produce the necessary variation in the conductance of the electric circuit to compensate for errors due to the compressibility of the fluid can be determined by calculation as described above, but in most cases it is simpler to determine experimentally the required arrangement and relative values to be used in a particular case.

It will be understood that when there is no flow in the conduit 10 the pressures communicated through tubes 14 and 15 to the surface of the liquid 17 in chambers 12 and 13, are the same and the liquid will stand at the same level in each chamber which level is that of the line $a$—$a$. But as the velocity of flow in the conduit rises the difference between the pressures communicated through the tubes increases, the liquid in chamber 12 is forced downwardly by the higher pressure, the liquid thus displaced rises within the chamber 13, and the height of the rising liquid column, which is a function of the resultant pressure is determinative of the resistance of the scale 18. Consequently, by suitably shaping the element 24 the desired correction is obtained.

From the foregoing it will be seen that a meter calibrated on the hydraulic equation may be readily converted to measure a compressible fluid without the necessity of making any fundamental changes in the structure thereof. Thus in the embodiment shown in Fig. 1 the adaptation is made by connection of the compensation reactance 24 in series with the instruments in the meter circuit, while in Fig. 2 the displacing element 24 is inserted in the chamber 12. By this method meters, in the field based on the hydraulic equation, may be readily adapted for the measurement of compressible fluids, without disturbing the installation, and the converse may be accomplished with equal facility.

It will be readily appreciated, to those skilled in the art, that the inventive idea illustrated in the accompanying drawing may be embodied in other forms than these herein shown without in any way departing from the spirit of the invention, and all such forms are intended to be included in the accompanying claims.

Having thus described my invention what I claim is:

1. In a meter for measuring the flow of a compressible fluid, the combination of means for measuring the rate of flow of said fluid, said means including a second means for producing a variable effect on the first means to correct said measurement for variations due to the compressibility of the fluid being measured.

2. A meter for measuring the flow of a compressible fluid through a conduit, said fluid being subject to variations in density during the measuring operation, comprising a means responsive to the velocity of the flowing fluid, indicating mechanism, means whereby said mechanism is controlled by the first named means, and means for varying said second means to compensate for variations in flow incident to variations in the compressibility of the fluid.

3. A meter for measuring the flow of a compressible fluid through a main, comprising an electrical indicating device, resistance means in circuit with said device and adapted to control its action, means operable in accordance with the flow through the conduit for varying the current in said circuit and means in said circuit for further varying the current therein to compensate for variations due to the compressibility of the fluid.

4. The combination with a main through which a compressible fluid flows, of a device responsive to the velocity of flow of fluid through the main, an indicator, means whereby the indicator is operated by the flow responsive device, and means for modifying the above responsive device to correct the indicator for errors due to compressibility of the fluid.

5. In a flow meter for an elastic fluid, an electric circuit including a source of current, a resistance element in said circuit variable with changes in the rate of flow of the fluid to be measured, a compensating reactance also in said circuit for varying the current therein to correct for the compressibility of the fluid and registering devices in said circuit and controlled in their action by the current in said circuit.

6. In a flow meter for an elastic fluid the combination with a main through which the fluid flows, of a differential pressure device in said conduit, an electric circuit including a source of current, a resistance element in said circuit, means responsive to the differential pressure for varying the resistance of said element, a reactance coil in series with said circuit and adapted to compensate for the compressibility of the fluid in passing through the pressure device and an indicating instrument in said circuit and controlled by the current therein.

7. The method of measuring the flow of a compressible fluid, which consists in establishing an electric current proportional to the flow and superimposing a secondary corrective effect proportional to the square of the flow upon said current to compensate for errors due to the compressibility of the fluid.

8. The method of measuring the flow of a compressible fluid which consists in varying the conductance of an electric circuit in accordance with the flow of the fluid and creating a separate variable effect on said conductance in accordance with a separate characteristic of the fluid to compensate for variations due to the compressibility of the fluid.

9. The method of measuring the flow of a compressible fluid, such as high pressure steam, which method consists in establishing a different pressure dependent on the flow of the fluid, registering the flow from the differential thus established and correcting said registration by variable amounts across the range of said registering device to correct for compressibility of the fluid.

10. A method of accurately measuring a compressible fluid which consists in establishing a differential head in the fluid proportional to the square of the velocity of the flow, varying the conductance of an electric circuit so that the current therein is proportional to the square root of the differential head, further varying the conductance of said circuit to compensate for the compressibility of the fluid in passing the differential producing device, and measuring the resultant conductance in terms of flow.

11. In a meter for elastic fluids comprising a pressure differential producer in the conduit through which the fluid to be measured flows, registering instruments and inter-connecting means between said producer and instruments, said meter calibrated in accordance with the hydraulic equation, governing incompressible fluids, the improvement which consists in means cooperating with said connecting means for causing said instruments to indicate at all rates of flow in conformity with the equation governing compressible fluids.

12. In a meter for compressible fluids comprising a device producing a differential pressure dependent on the flow of the fluids and electrical means for registering the flow from the differential pressure, said meter designed and calibrated in accordance with the laws of incompressible fluids, the improvement which consists in electrical means cooperating with the electrical registering means to make the registration thereof conform to the laws governing compressible fluids.

13. The method of measuring the flow of compressible fluids, which method comprises making said measurement in accordance with laws governing incompressible fluids and correcting said measurement by varying amounts at the various rates of flow to compensate for the difference between said laws and the actual laws governing compressible fluids.

JACOB M. SPITZGLASS.